(12) United States Patent
Stanton et al.

(10) Patent No.: US 6,340,202 B1
(45) Date of Patent: Jan. 22, 2002

(54) WINDOW STRUCTURE FOR MASS TRANSIT VEHICLE

(75) Inventors: William H. Stanton; Gary Blaine Penelton; Glenn Campbell, all of Winnipeg (CA)

(73) Assignee: New Flyer Industries Limited, Winnipeg (CA)

( * ) Notice: Subject to any disclaimer, the term of this patent is extended or adjusted under 35 U.S.C. 154(b) by 0 days.

(21) Appl. No.: 09/496,685

(22) Filed: Feb. 3, 2000

(51) Int. Cl.⁷ .............................................. B60R 27/00
(52) U.S. Cl. .................. 296/201; 296/178; 296/146.16; 296/96.2; 49/381; 49/141; 49/98.1; 16/355
(58) Field of Search ................................ 296/201, 178, 296/146.16, 96.2; 49/381, 141, 98.1, 489.1; 16/355, 356

(56) References Cited

U.S. PATENT DOCUMENTS

| | | | |
|---|---|---|---|
| 2,668,735 A | * 2/1954 | Brockway | 49/141 |
| 2,852,802 A | * 9/1958 | Seby | 16/355 |
| 4,469,369 A | * 9/1984 | Belik et al. | 296/197 |
| 4,635,396 A | * 1/1987 | Ranz et al. | 49/141 |
| 5,139,302 A | * 8/1992 | Kanke | 296/201 X |
| 5,189,820 A | * 3/1993 | Komamura | 40/156 |
| 5,544,457 A | 8/1996 | Labrecque | |
| 5,575,115 A | * 11/1996 | Lindgren et al. | 49/381 |
| 5,787,643 A | 8/1998 | Schmuck | |
| 5,941,022 A | 8/1999 | Schmuck | |

* cited by examiner

Primary Examiner—Stephen T. Gordon
Assistant Examiner—Lori L Coletta
(74) Attorney, Agent, or Firm—Adrian D. Battison; Michael R. Williams

(57) ABSTRACT

A public transit vehicle has a vehicle body having a roof defining an interior ceiling surface, two side walls each extending longitudinally of the vehicle including an upper side wall portion connecting to the roof and a row of windows underneath the upper portion, a central aisle and two rows of seats each on a respective side of the aisle and along the side wall at the windows. Each window comprises an outer pan attached into the window opening in the frame and a pane structure pivotally mounted in the pan. The pan is formed by four sides each of which is integrally defined by a web bridging the width of the frame, an exterior flange projecting outwardly and an interior flange projecting inwardly with the pan held in place by adhesive between the exterior surface of the frame and the exterior flange and between the web and the corresponding surface of the frame. The pan is thus imperforate to prevent moisture penetration. The pane includes an external frame sealed relative to the pan sides by three separate seals. The pane is suspended from a pivot at the top and is latched by latches in the bottom frame of the pane.

15 Claims, 10 Drawing Sheets

WINDOW STRUCTURE FOR MASS TRANSIT VEHICLE

This invention relates to window structure for a mass transit vehicle.

This application is related to a series of four further applications all filed simultaneously with this application and assigned to the same assignee as follows:

Application Ser. No. 09/496,686 filed Feb. 3, 2000 and entitled Interior Structure of a Mass Transit Vehicle.

Application Ser. No. 09/497,634 filed Feb. 3, 2000 and entitled Passenger Lighting System for Mass Transit Vehicle.

Application Ser. No. 09/497,633 filed Feb. 3, 2000 and entitled Side Impact Structure of Mass Transit Vehicle.

Application Ser. No. 09/496,684 filed Feb. 3, 2000 and entitled Body Structure for Mass Transit Vehicle.

The disclosures of the above applications are incorporated herein by reference.

BACKGROUND OF THE INVENTION

In public transport vehicles particularly buses but also including rail cars, it is conventional to provide a structure having a side wall frame which is cladded on its inside and outside surfaces to form a side wall structure. Where windows are required, the frame defines a window opening with the cladding coming up to the edge of the window opening and leaving the window opening open for the insertion of a separate window frame structure which attaches to the frame of the side wall over the cladding and holds the window in place.

In most windows for such public transit vehicles, it is necessary to provide a window pane structure which pivots relative to the frame to allow an opening action for emergency escape.

There has been up till now a significant problem of moisture leakage in window structures of this type in that the moisture enters between a multi part window frame structure and the cladding, penetrating either the interior of the vehicle, or often more dangerously, into the wall structure of the vehicle causing hidden corrosion.

Some examples of window frame structures of this general type are shown in U.S. Pat. No. 5,544,457 (Labrecque) assigned to Prevost and U.S. Pat. Nos. 5,787,643 and 5,941,022 (Schmuck) assigned to Excel Industries.

SUMMARY OF THE INVENTION

It is one object of the present invention, therefore, to provide an improved window assembly for mounting in the window opening of a public transit vehicle.

According to a first aspect of the invention there is provided a public transit vehicle comprising:
  a vehicle body having:
    a roof,
    two side walls each extending longitudinally of the vehicle,
    a vehicle floor connected to the side walls and spanning therebetween;
  each side wall including a plurality of window openings at spaced positions longitudinally of the side wall each for receiving a respective window;
  each window including a rectangular window frame fastened to the side wall and carried thereby so surround the window opening defining a window plane parallel to the side wall;
  the window frame comprising a pan defined by four side pan members each along a respective side of the central window opening, each pan member being shaped in cross section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;
  each window including a rectangular window pane structure having a window pane in the window plane and a surrounding frame member attached to the pane;
  the window pane structure being mounted in the window frame and including sealing elements butting against the window frame;
  the web portion, exterior flange portion and interior flange portion being formed as an integral structure so as to prevent the penetration of exterior moisture therethrough to the interior.

Preferably the pan is attached to the side wall by a structural interconnection which is formed substantially wholly by an adhesive connection between the exterior flange and an adjacent surface of the side wall and an adhesive connection between the web portion and an adjacent surface of the side wall.

Preferably the side wall includes a side wall frame having four frame members each on a respective one of two sides, top and bottom respectively of the window opening, each frame member defining an exterior wall and a web wall and wherein the exterior flange is attached by adhesive to the exterior wall and the web portion is attached by adhesive to the web wall.

Preferably the pan is molded as an integral structure.

Preferably a bottom one of the pan members includes a further web portion attached to an outermost edge of the exterior flange and extending therefrom away from the window plane and a further flange portion attached to an outer edge of the further web portion and extending therefrom away from the window opening, wherein the side wall includes a cladding member carried thereby underneath the windows and wherein the further flange portion overlaps a top edge of the cladding member and is attached thereto by adhesive.

Preferably there is provided a support member for the pane structure along a top one of the pan members, the support member defining a hinge allowing pivotal movement of the pane structure about a horizontal axis from a closed position to an open position, the hinge being arranged above the web portion of the top pan member such that the frame members are inserted into the pan in the closed position and pivot out of the pan in the open position.

Preferably the frame members in the closed position abut the pan members so that the pan members and the frame members co-operate in providing structural strength for the window.

Preferably the hinge allows removal of the pane structure from the frame structure as an integral unit.

Preferably the hinge comprises a part cylindrical receptacle within which is received a part cylindrical insert of the pane structure allowing pivotal movement of the pane structure about a horizontal axis defined by the receptacle and wherein the part cylindrical receptacle and the part cylindrical insert are arranged such that the insert can be removed out of the receptacle in a transverse direction relative thereto after pivotal movement of the pane structure beyond a predetermined position thereof.

Preferably the insert includes end insert members therein extending axially beyond respective ends thereof and wherein the support member includes end mounting blocks thereon to prevent removal of the insert unless the mounting blocks are removed.

Preferably the support member forms part of a drip rail member attached to the side wall above the top pan member and defining a generally horizontal drip channel extending along the side wall.

Preferably the top pan member includes a flange portion extending upwardly therefrom and overlapped by the drip rail member.

Preferably the side wall includes a side wall cladding member mounted on the side wall above the window and wherein the cladding member has a bottom edge flange overlapping a top edge flange of the drip rail member.

Preferably the frame member of the pane structure includes a first portion adjacent the exterior flange portion and a second portion projecting across the web portion to a position adjacent the interior flange portion, and wherein the window pane is mounted on an exterior surface of the frame member and extends to a position on the frame member at the first portion so as to overlie at least a part of the exterior flange portion.

Preferably there is provided a resilient sealing member attached to the frame member and having a first lip overlying an edge of the window pane and a second lip bridging a space between the first portion of the frame member and the exterior flange portion.

Preferably there is provided a resilient seal between an interior surface of the first portion and an exterior surface of the exterior flange portion.

Preferably at least one of the frame members of the pane structure includes a latch lever pivotally mounted inside a hollow interior thereof, the latch lever being engageable with a pin member carried on the frame and projecting through the web of the pan at a position adjacent the latch lever for projecting into the hollow interior of said one of the frame members, the latch lever including a positive locking cam action on the pin.

According to a second aspect of the invention there is provided a public transit vehicle comprising:
  a vehicle body having:
    a roof,
    two side walls each extending longitudinally of the vehicle,
    a vehicle floor connected to the side walls and spanning therebetween;
    each side wall including a plurality of window openings at spaced positions longitudinally of the side wall each containing a respective window;
    each window including a rectangular window frame fastened to the side wall and carried thereby so surround the window opening defining a window plane parallel to the side wall;
    the window frame comprising a pan defined by four side pan members each along a respective side of the central window opening, each pan member being shaped in cross section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;
    each window including a rectangular window pane structure having a window pane in the window plane and a surrounding frame member attached to the pane;
    the window pane structure being mounted in the window frame and including sealing elements butting against the window frame;
    wherein there is provided a support member for the pane structure along a top one of the pan members, the support member defining a hinge allowing pivotal movement of the pane structure about a horizontal axis from a closed position to an open position, the hinge being arranged above the web portion of the top pan member such that the frame members are inserted into the pan in the closed position and pivot out of the pan in the open position.

According to a third aspect of the invention there is provided a public transit vehicle comprising:
  a vehicle body having:
    a roof,
    two side walls each extending longitudinally of the vehicle,
    a vehicle floor connected to the side walls and spanning therebetween;
    each side wall including a plurality of window openings at spaced positions longitudinally of the side wall;
    each window including a rectangular window frame fastened to the side wall and carried thereby so surround the window opening defining a window plane parallel to the side wall;
    the window frame comprising a pan defined by four side pan members connected at corners of the pan, each pan member being shaped in cross-section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;
    each window including a rectangular window pane structure having a window pane in the window plane and a surrounding frame member attached to the pane;
    the window pane structure being mounted in the window frame and including sealing elements butting against the window frame;
    wherein at least one of the frame members of the pane structure includes a latch lever pivotally mounted inside a hollow interior thereof, the latch lever being engageable with a pin member carried on the frame and projecting through the web of the pan at a position adjacent the latch lever for projecting into the hollow interior of said one of the frame members, the latch lever including a jaw for receiving and engaging the pin, the jaw being arranged to provide a positive locking cam action on the pin.

Preferably the latch lever is provided in the bottom frame member.

Preferably the latch lever is operated by an actuating rod extending along the frame member and wherein there is provided an actuating handle mounted on the vehicle and pivotal relative thereto for driving movement of the actuating rod.

BRIEF DESCRIPTION OF THE DRAWINGS

One embodiment of the invention will now be described in conjunction with the accompanying drawings in which.

DETAILED DESCRIPTION

Figure 1:
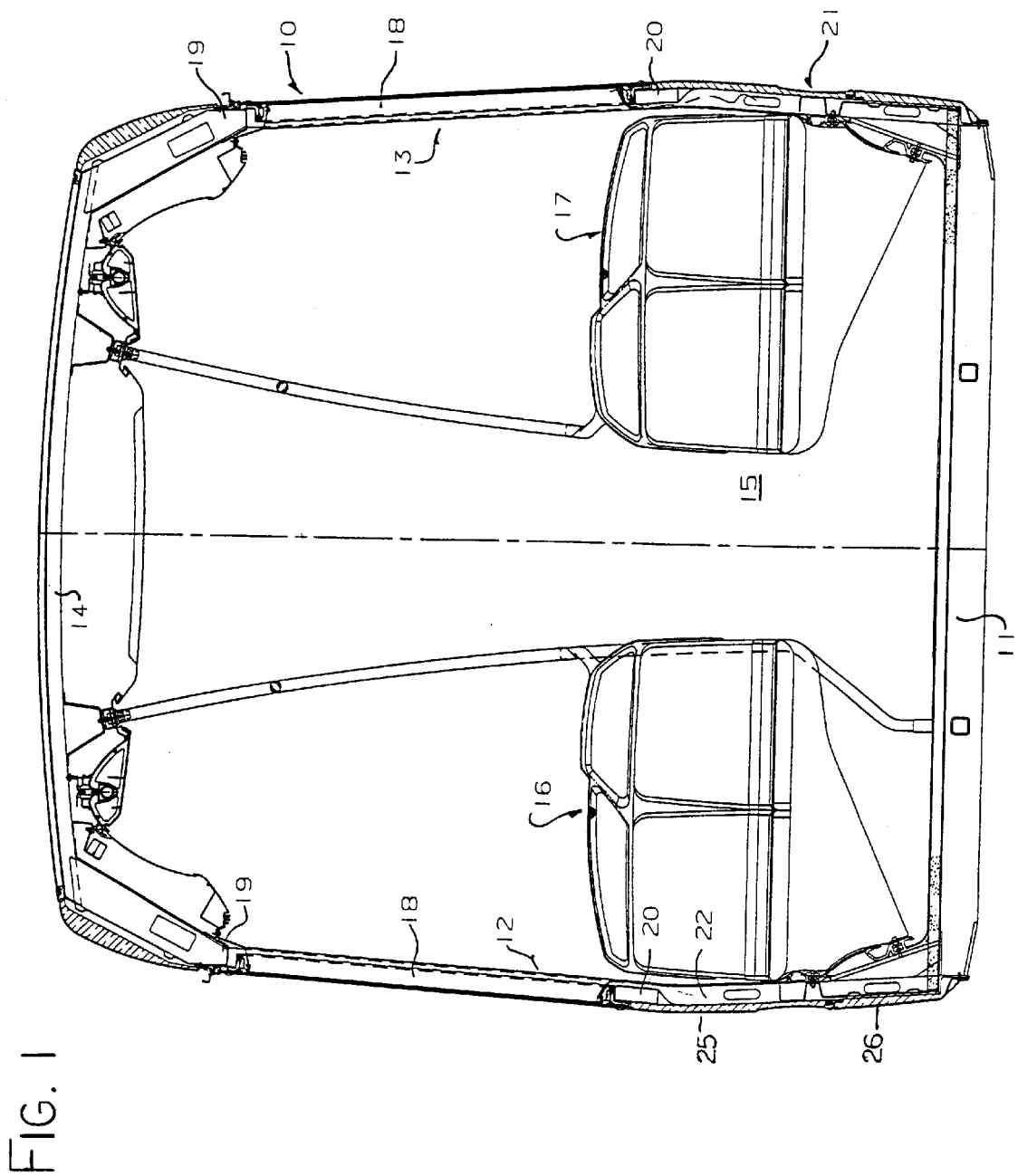
FIG. 1 is a vertical cross-sectional view through a public transit vehicle according to the present invention.
Figure 2:
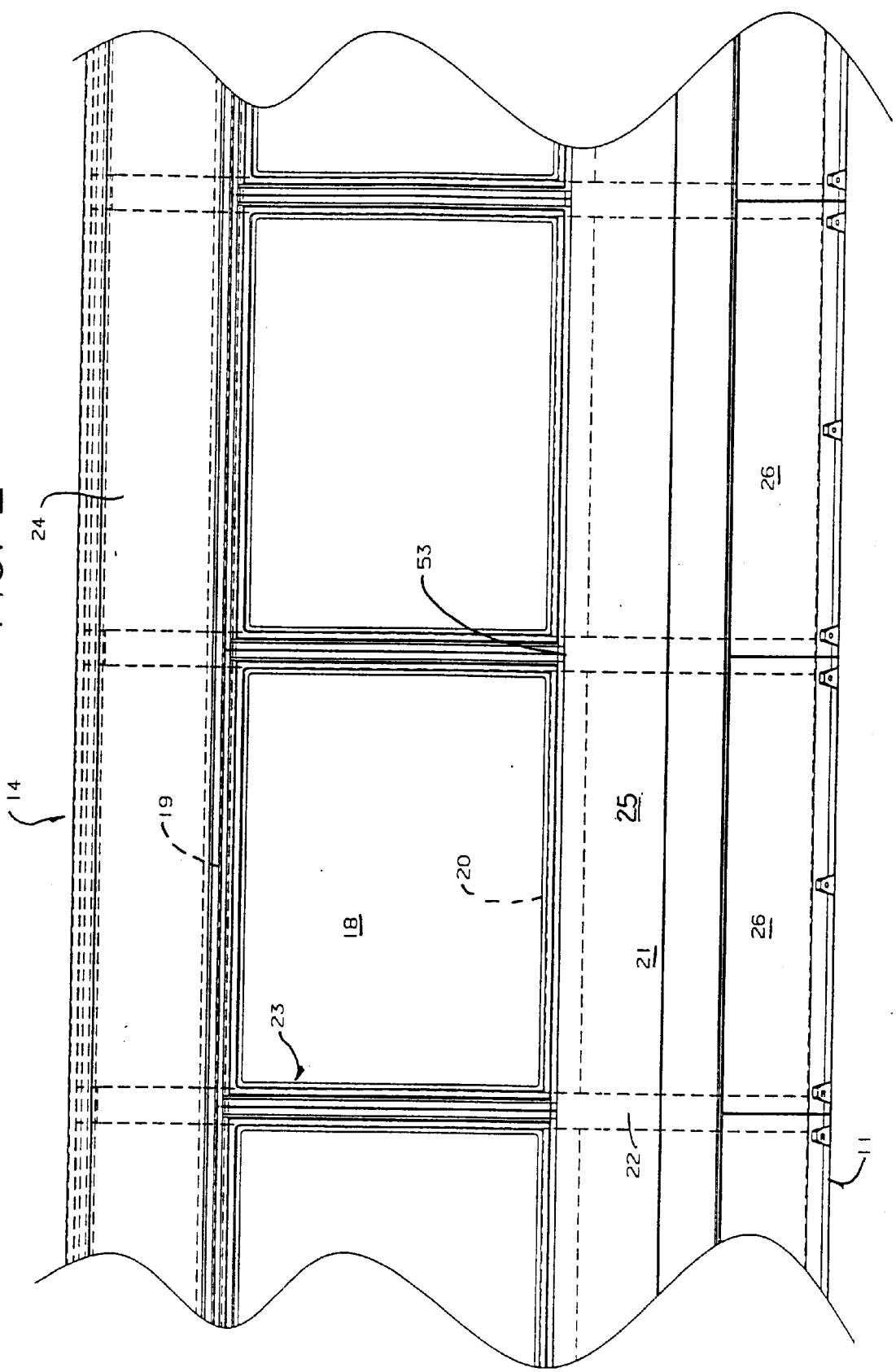
FIG. 2 is a side elevational view of one part of the vehicle of FIG. 1.

The vehicle 10 comprises a floor 11, side walls 12 and 13 and a roof structure 14. The vehicle includes a central aisle 15 between two rows 16 and 17 of passenger seats. Each side wall includes a row of windows 18 commencing at a top rail 19 and extending downwardly to an intermediate rail 20. Beneath the windows the side wall is closed to define a closed cladded section 21.

The side wall structure further includes a plurality of vertical posts 22 at positions longitudinally of the side wall and extending from the floor structure 11 to the rail structure 19. The window openings are thus defined between the rail structure 19 and the rail 20 and in between the posts 22 and window frame assembly 23 is inserted into the window opening so defined.

The side wall is clad on its exterior surface by a coping cladding panel 24 extending between the roof structure and the top rail 19 and by a side wall cladding panel 25 which extends along the sidewall underneath the window openings together with a plurality of impact panels 26 arranged edge to edge along the side wall underneath the sidewall panel 25.

The details of the cladding panels and the structure of the side wall form the subject matter of separate ones of the above identified co-pending applications, the subject matter which is incorporated herein by reference.

Figure 3:
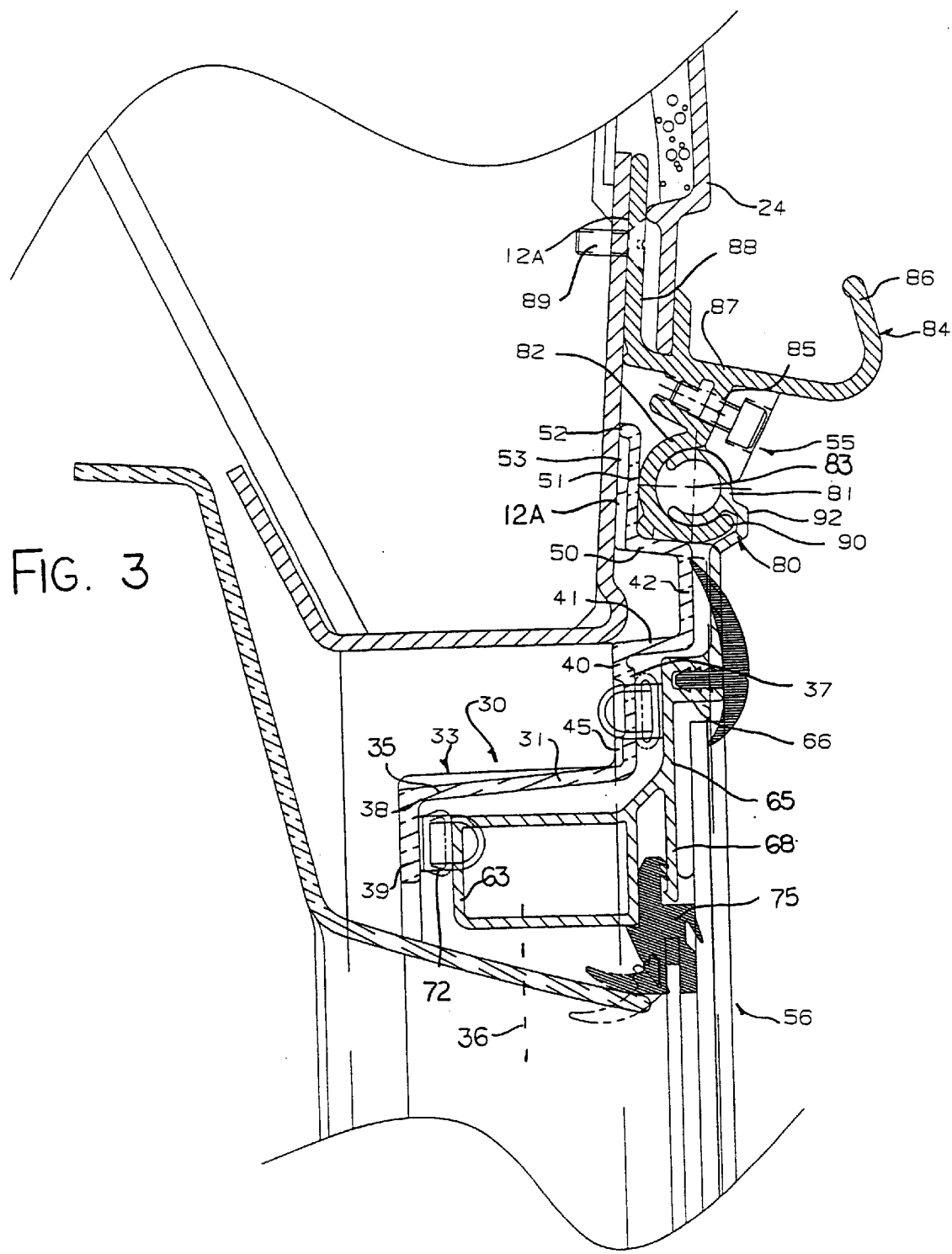
FIG. 3 is a similar vertical cross-sectional view to that of FIG. 1 on an enlarged scale and showing the window assembly only at a top of the window assembly including the pane structure, the frame and the mounting for the frame.
Figure 6:
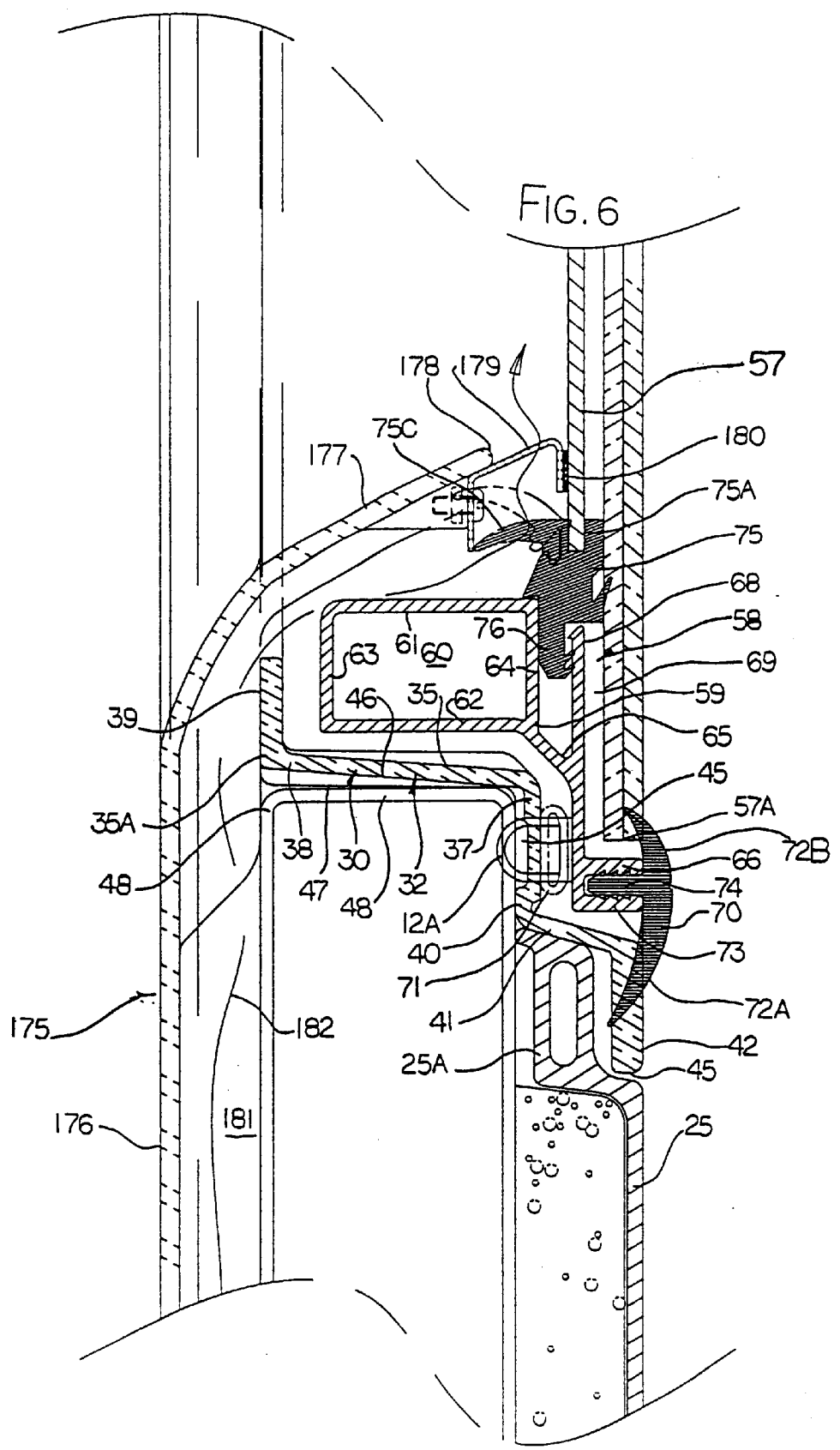
FIG. 6 is a similar cross-section to that of FIG. 3 showing the bottom of the window assembly.
Figure 7:
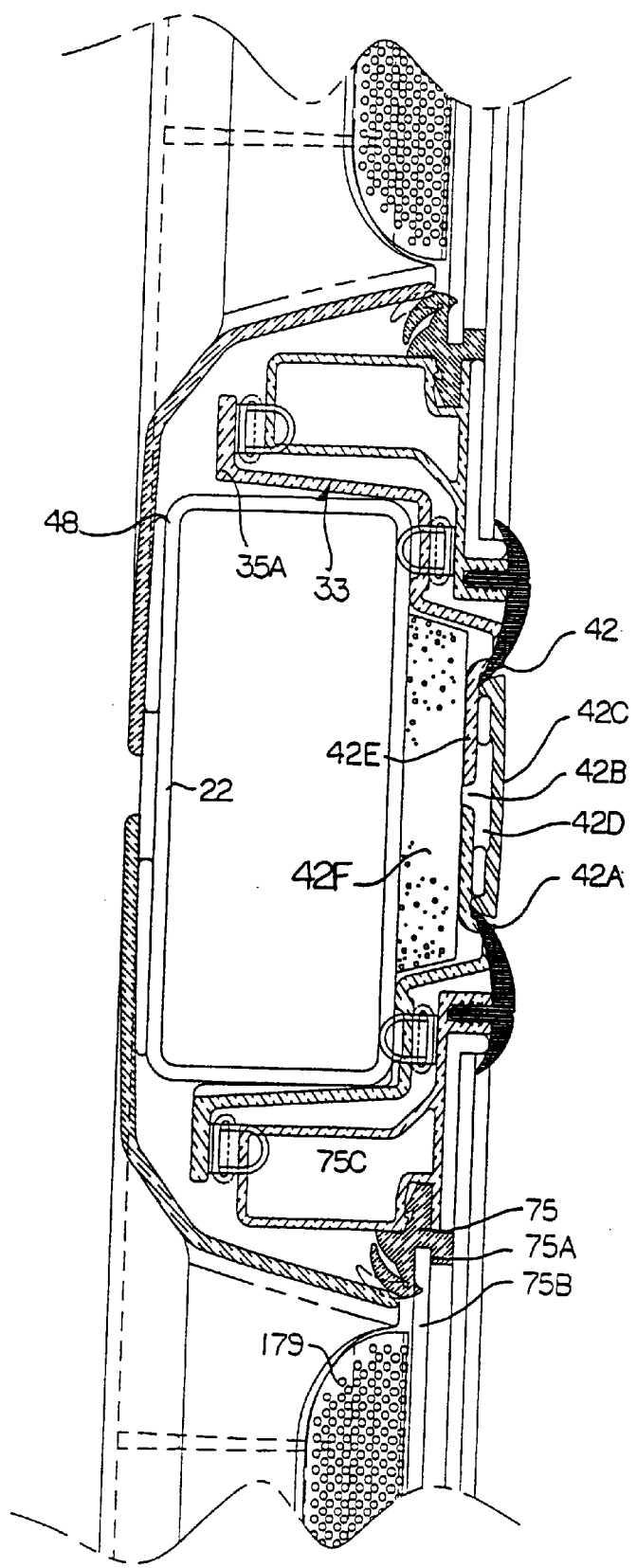
FIG. 7 is a horizontal cross section through two adjacent window frames at the post between the window openings.

Turning now to FIGS. 3, 6 and 7, the window assembly 23 is shown in cross section. The window assembly 23 comprises an external window frame or pan 30 formed by four side frame members connected together at right angle corners so as to form a complete surrounding frame structure which can be inserted into the window opening in the side wall. The side frame members are preferably integrally molded so that the corners are integral but can also be formed from individual elements welded or otherwise mechanically connected at the corners. The side frame members are thus preferably integrally molded using either sheet molding compound, a material well known to one skilled in the art, or other material which forms an integral structure with suitable finished surfaces and suitable strength. This molding avoids any connections which could leak but other connection techniques can be used which allows individual elements to be connected together at the corners in a manner which forms ineffectively integral frame or pan structure resistant to leaks between the members at the corners.

The top frame member 31 is shown in FIG. 3. Two of the side frame members 33 of adjacent window openings are shown in FIG. 7 and the bottom frame member 32 is shown in FIG. 6.

Each frame member 31, 32, 33 includes a web portion 35 which extends generally at right angles to the plane 36 of the window opening. At the exterior edge of the web portion 35 is attached an exterior flange 37 lying generally parallel to the plane 36. At the interior edge 38 of the web portion is provided an interior flange 39 which extends from the web portion generally parallel to the plane 36. The exterior flange 37 extends outwardly of the web portion, that is outwardly of the window opening onto the exterior surface of the side wall structure. The interior flange 39 extends from the edge 38 of the web portion inwardly of the window opening so as to form a lip covering an external surface 12A around the window opening. The web portion, the exterior flange and the interior flange are formed integrally as explained previously and each is substantially imperforate so that there is little or no possibility for the penetration of moisture through the frame structure.

At the outermost edge of the exterior flange 37 there is provided a projection portion 40 which turns inwardly toward the exterior surface 12A of the side wall structure followed by a second web portion 41 which projects generally at right angles to the plane 36 that is in the exterior direction away from the surface 12A. At the end of the second web portion 41 furthest spaced from the surface 12A is provided a further flange portion defining a lip 42. This extends parallel to the plane 36 and thus parallel to the surface 12A but is spaced from the surface 12A as an overhanging lip portion extending to a lip edge 43.

The structure defined by the web portions and flanges is integral with the previously described portions of the pan. The cross section of all four of the frame sides is identical to the above described elements. The closed pan is attached to the window opening as defined by the top rail 19, the bottom rail 20 and the two vertical posts 22 by a first portion 45 of adhesive inserted between the inside surface of the exterior flange 37 and the outside surface of the respective frame member 19, 20, 22. A second portion 46 of adhesive is inserted between the web 35 and the inwardly facing surface 47 of the web portion 48 of the respective frame member 19, 20, 22. It will be noted that the first portion 45 is received between the projection 40 and the corner of the frame member. The portion 46 is received between the corner 48 of the frame member and the edge 35A of the web 35. The web 35 is arranged at a slight angle to the surface 47 so that the portion 46 of adhesive is generally triangular and increases in thickness. It will be noted that the edge 35A is spaced inwardly from the corner 48 at the interior of the frame member. Thus the pan does not project into the interior but is either located at the corner, as shown in FIG.

6, or is spaced from the corner 48 to the exterior of that corner that is towards the exterior of the side wall, as shown in FIG. 7.

The pan is thus formed in a single piece and is fastened at the exterior surface of the frame member of the sidewall and is supported within the frame members wholly by the adhesive attachment provided by the adhesive portions 45 and 46. There is no necessity for any couplings which clamp the pan to the interior surface of the frame member. The adhesive attachment is sufficient to provide the structural requirement for holding the pan in place within the window opening and providing the necessary seals.

In an alternative arrangement (not shown), the interior flange 38 may be stiffened by a member which is attached on its interior surface and which spans from that interior surface to the interior surface of the frame member. Such a stiffening member does not significantly act to provide structural strength holding the window pan in place but simply provides a stiffening of the flange to prevent its cracking or breakage should the window pane structure be slammed into the closed position abutting the pan.

As shown in FIG. 6, the lip portion overlaps a top edge 25A of the panel 25. Further detail concerning construction of this panel is shown and described in one of the above co-pending applications, the disclosure which is incorporated herein by reference.

As shown in FIG. 7, the lip portion 42 of the side frame member of the pan approaches but is spaced from the lip portion 42A of the side portion of the pan of the next adjacent window frame construction leaving a space 42B therebetween for expansion and tolerances. A facing band or strip 42C is applied over recessed sections 42E of the adjacent portions 42 and 42A. The recessed sections overlie a strip of insulation material 42F on the exterior of the post 22. The strip 42C is attached to the recessed sections by adhesive material 42D thus providing an attractive strip vertically between the two window frames and allowing for thermal expansion and contraction.

As shown in FIG. 3, the profile of the top pan member is yet further supplemented by an inturned web portion 50 generally parallel to and spaced outwardly from the lip portion 41 and connected to the outermost edge of the lip portion 42. Further at the edge of the web portion 50 adjacent the outside surface 12A is provided a yet further flange 51 which extends outwardly from the pan structure that is upwardly of the outside surface 12A away from the window opening to a projection 52 turned into contact with the surface 12A. This defines an area for receiving a further portion of adhesive 53 thus attaching the flange 51 to the surface 12A. The flanges 51 and 37 and the corresponding adhesive portions 53 and 45 thus provide a double seal arrangement effectively preventing the penetration of moisture inside the pan into the interior. Yet further the flange 51 is covered by a mounting assembly 55 for a window pane structure 56 carried in the window pan.

The window pane structure as best shown in the cross section of FIG. 6 comprises an external laminated or tempered glass pane 57 which is attached to and supported by a rectangular surrounding frame 58 defined by four frame members 59, formed for example of aluminum, which are connected at mitre joints at four corners. One of the frame members is shown in FIG. 6 in cross section and it will be appreciated that each of the other frame members is substantially identical so that the frame members can be connected together by mitre joint at the corners but the top frame member shown in FIG. 3 includes additional elements for attachment to the mounting 55 as described in more detail hereinafter.

The frame member 59 comprises generally a hollow rectangular section 60 having an inner wall 61, an outer wall 62, an interior wall 63 at right angles to the walls 61 and 62 and an exterior wall 64 parallel to the wall 63. The wall 64 includes an extension portion 65 extending beyond the wall 62 in a direction outwardly of the window opening to a flange 66 at right angles to the wall 64 and extending toward the exterior just beyond an edge 57A of the glass pane.

Attached to the extension portion 65 and extending parallel to the wall 64 is provided a projecting portion 68 which lies parallel to and spaced from the interior surface of the glass pane to locate the frame member relative to the glass pane. This leaves between the exterior surface of the projecting portion 68 an area for receiving an adhesive 69 which fills the area adjacent the surface 64 and adhesively bonds the frame member to the interior surface of the glass pane.

The frame member at the bottom and sides carries two separate seal members for effecting a seal between the frame member and the pan. The first seal is indicated at 70 and is mounted on the exterior of the glass pane. A second bulb seal 71 is mounted by adhesive on the flange 37 and is compressed, in the closed position of the pane structure, by a portion of the interior surface of the extension portion 65 which is parallel to the flange 37.

The seal 70 comprises a mounting leg 74 projecting into a slot 73 in the flange 66, the slot 73 facing in the exterior direction so as to define an open mouth at the exterior surface of the flange 66. The leg is held in place by transverse fins abutting the sides of the slot. The leg 74 carries two lips 72A and 72B which extend generally at right angles to the leg. The lip 72 bridges the space between the flange 66 and the edge 57A of the glass pane. The lip 72A bridges the space between the flange 66 and the lip portion 42 of the pan. The lips 72A and 72B form a common curved shape so as to provide an attractive appearance along the edge of the glass pane. The lip 72A thus forms a first seal against the lip portion 42 to prevent the penetration of moisture and/or air into the area between the frame member and the pan.

The same sealing arrangements can be seen in FIG. 3 for cooperation with the top frame member and in FIG. 7 with the side pan member. At the top only, a third bulb seal 72, for extra sealing effect where there is most likelihood of water penetration, is located at the interior flange 39 and abuts against the wall 63 in a third sealing action. The third seal is similar to the second seal and is adhesively attached to the interior flange 39 and projects therefrom toward the wall 63 against which it is compressed in the closed position of the window frame.

A resilient mounting profile 75 is provided between the frame member and the pane and includes a leg 76 projecting into the space between the flange 68 and the wall 64 and a body extending from the leg to the interior surface of the pane thus closing off the area containing the adhesive 69. The body defines a slot 75A for supporting a pane 75B of polycarbonate to provide a double glazing arrangement which protects the inside surface of the main pane. The profile 75 can be pealed back to allow the release and replacement of the pane 75B which flexes out of its position.

The interior cladding 175 includes a panel 176 which covers the inside surface of the frame and then curves inwardly and toward the exterior at a curved portion 177 to an edge 178 terminating closely adjacent but spaced from the pane 75B. At the bottom only, a perforated grille 179 is attached at the edge 178 and closes the gap with a lip 180 in engagement with the pane. The grille 179 allows heated air 182 to escape from the area 181 behind the panel 176 over the interior flange of the pan, around the bottom frame member onto the window for de-fogging. The profile 75 includes a lip seal 75C which projects from the body toward the portion 177. At the top and sides, the lip seal 75C butts the portion 177 and provides a seal. At the bottom, the lip seal butts a portion of the grill 179 but allows the flow of air. The construction of the air supply forms the subject of one of the above applications and can be consulted for further details.

In an alternative arrangement (not shown) the protector pane 75B is omitted and the profile 75 is shaped without the slot 75A.

Figure 4:
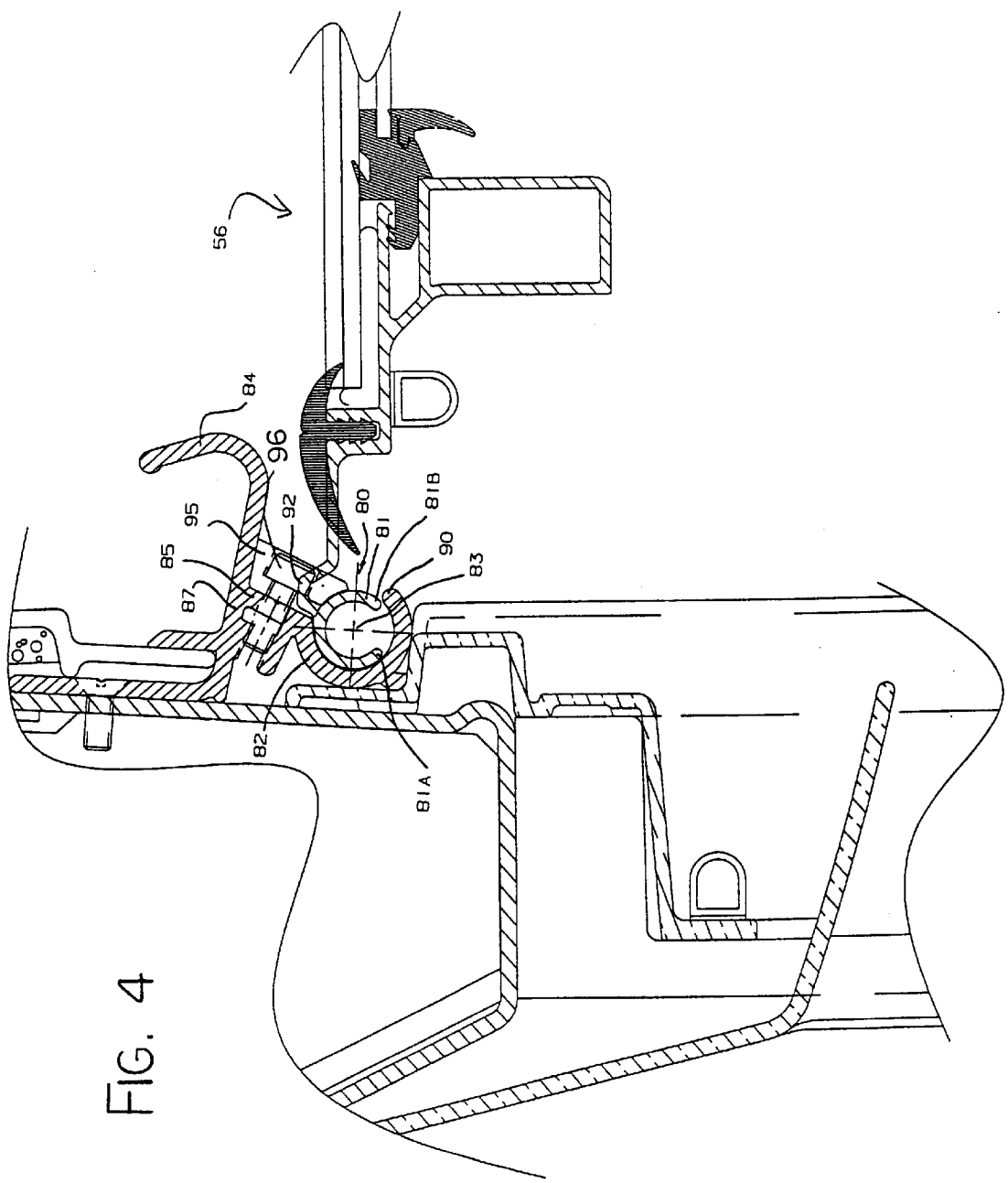
FIG. 4 is a similar cross section to that of FIG. 3 showing the window pane structure in the opened position.
Figure 5:
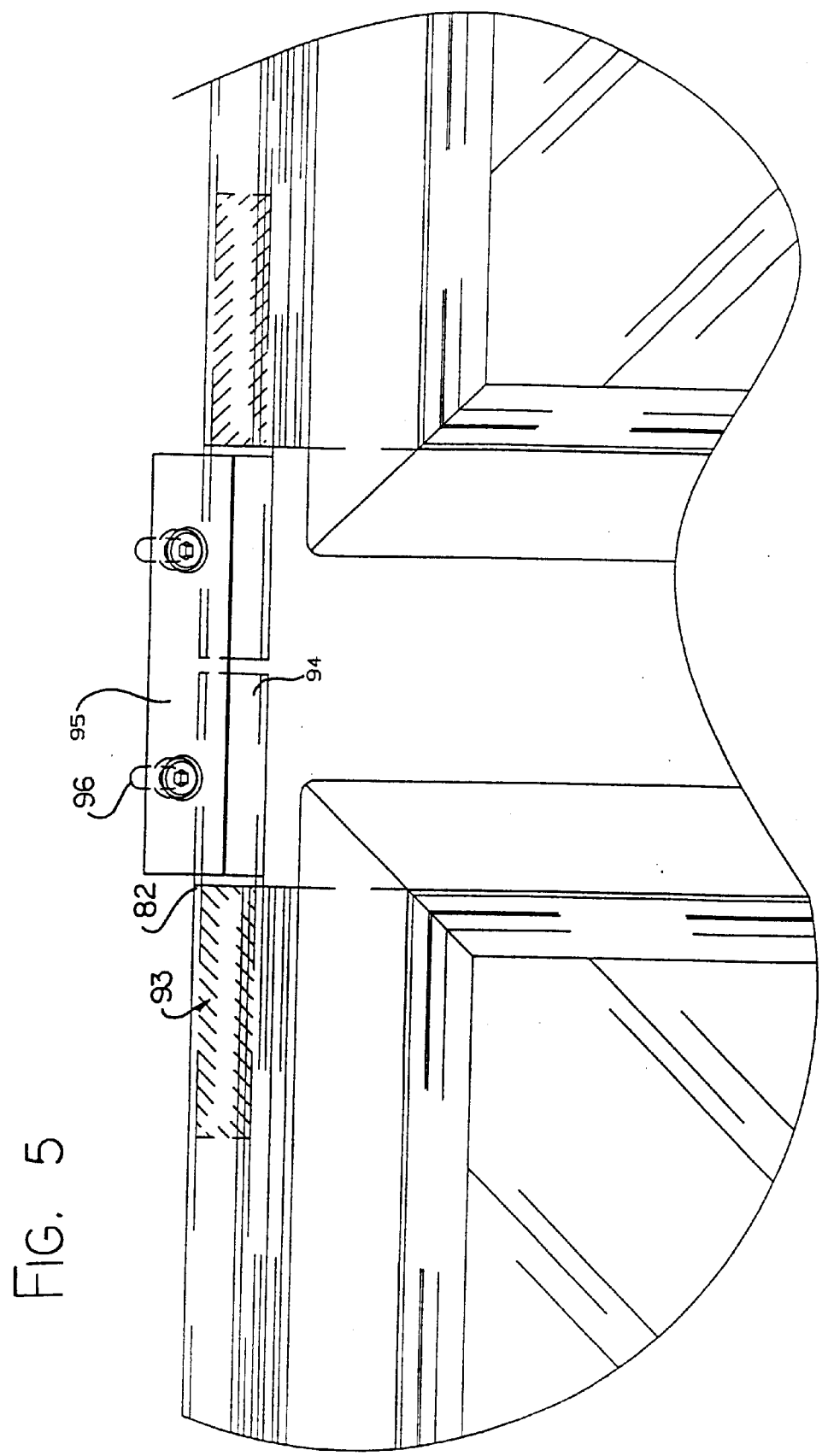
FIG. 5 is a front elevational view of one corner of the window in the position of FIG. 3.

Turning now to FIGS. 3, 4 and 5, the mounting assembly 55 by which the pane structure 56 is mounted in the pan is shown in detail. Thus the mounting assembly 55 comprises a connector 80 attached to and carried by the exterior edge of the flange 66. The connector 80 comprises a wall extending outwardly from the flange 66 toward a part cylindrical insert 81 carried within a part cylindrical receptacle 82 for pivotal movement relative thereto about an axis 83.

A part of the receptacle 82 engages over the flange 51 and the web 50 and is received within the angle therebetween. The receptacle 82 is attached to a drip rail 84 by a web portion 85 projecting upwardly from an uppermost edge of the part cylindrical receptacle 82. The drip rail 84 includes an exterior flange 86, a base 87 and an interior flange 88 attached against the surface 12A and fixed thereto by screws 89 and a structural adhesive.

A bottom edge of the coping panel 24 engages over the flange 88 so as to act as a water shedding arrangement which is more clearly described in and forms part of the subject matter of one of the above co-pending applications, the disclosure of which is incorporated herein by reference.

The bottom edge of the part cylindrical receptacle 82 is indicated at 90 and the connector 80 includes a U-shaped portion 92 which wraps around the portion 90. Thus the receptacle 82 encloses the part cylindrical insert 81 sufficiently to hold it in place in the closed position shown in FIG. 3.

As shown in FIG. 4, the pane structure 56 can be pivoted about the axis 83 from the vertical position shown in FIG. 3 to the horizontal shown in FIG. 4 where the U-shaped portion 92 reaches the web 85. In this position it will be noted that the part cylindrical insert 81 can be pulled horizontally out of the part cylindrical receptacle 82 since the bottom edges 81A and 81B of the insert can clear the edge 90 of the receptacle. In this way the pane structure can be removed for replacement or service.

In order to prevent the window from being removed except when properly required by service personnel, a locating piece 93 is inserted into each end of the part cylindrical insert 81 and bonded in place so as to define a stub shaft 94 projecting outwardly beyond the end of the part cylindrical insert at the respective side of the pane structure as shown in FIG. 5. This stub shaft portion 94 is thus exposed beyond the end of the pane structure and defines an outside cylindrical surface matching that of the interior of the receptacle 82. A removal prevention block 95 is mounted at the stub shaft 94 on the web 85 and fills the space between the stub shaft and the underside of the base 87 of the drip rail 84. Thus, with the removal block 95 in place held by bolts 96, the window can be pivoted to the open position shown in FIG. 4 but cannot be removed unless the block 95 is first removed. The block 95 is held in place by a bolt 96 passing through the block and into the web 85. The bolt is removed only by authorized personnel allowing the pane structure to be removed. The window can be pivoted to the open position shown in FIG. 4 as a safety exit in the event that exit through the conventional doors is prevented or inhibited.

Figure 8:
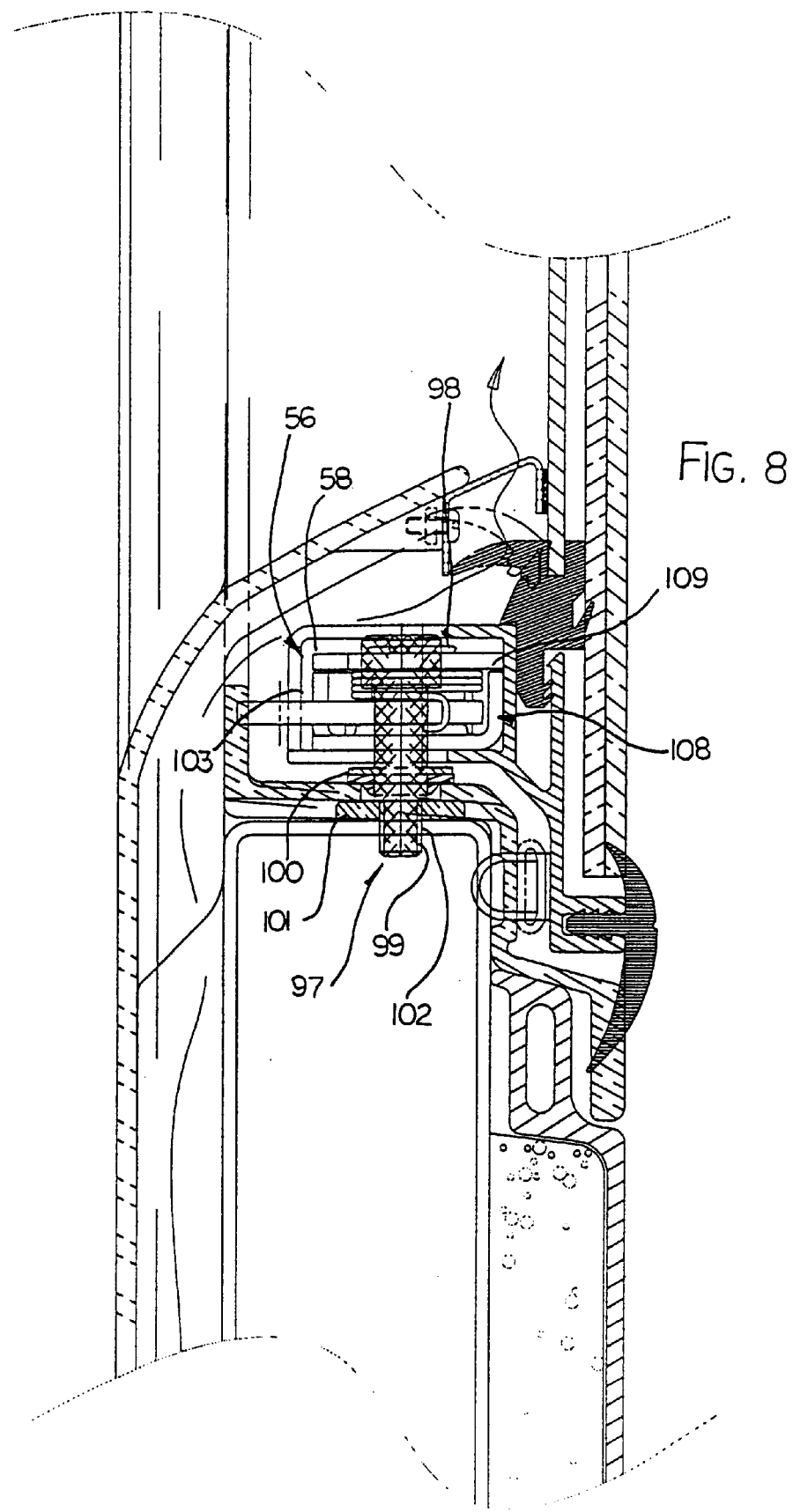
FIG. 8 is a similar cross section to that of FIG. 6 on an enlarged scale and taken through a window latch in the bottom frame of the window pane structure.
Figure 9:
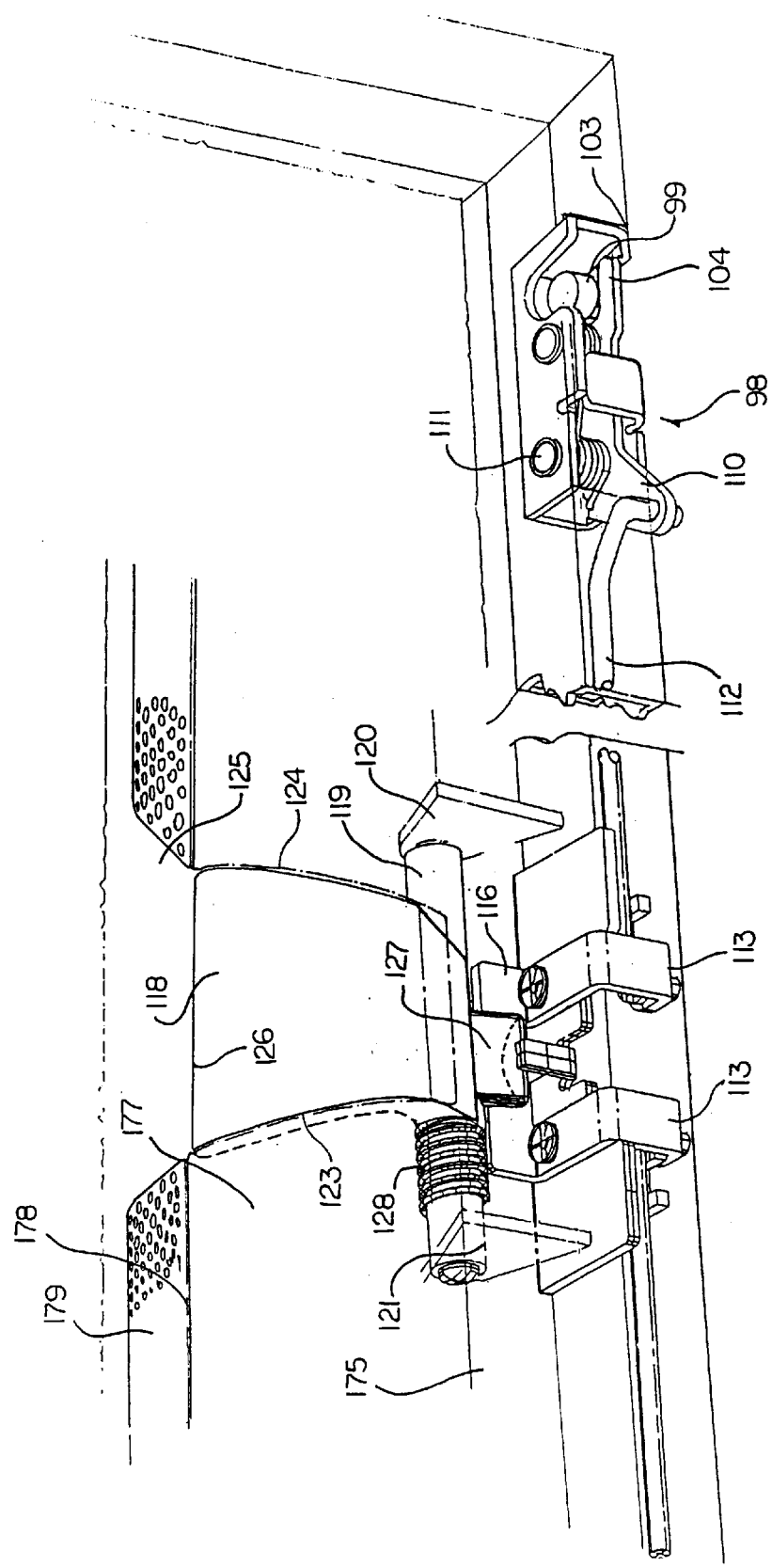
FIG. 9 is an isometric view partly broken away to show the latch of FIG. 8 including a central operating lever for actuating two latching arrangements and showing the latch lever in a closed latched position.
Figure 10:
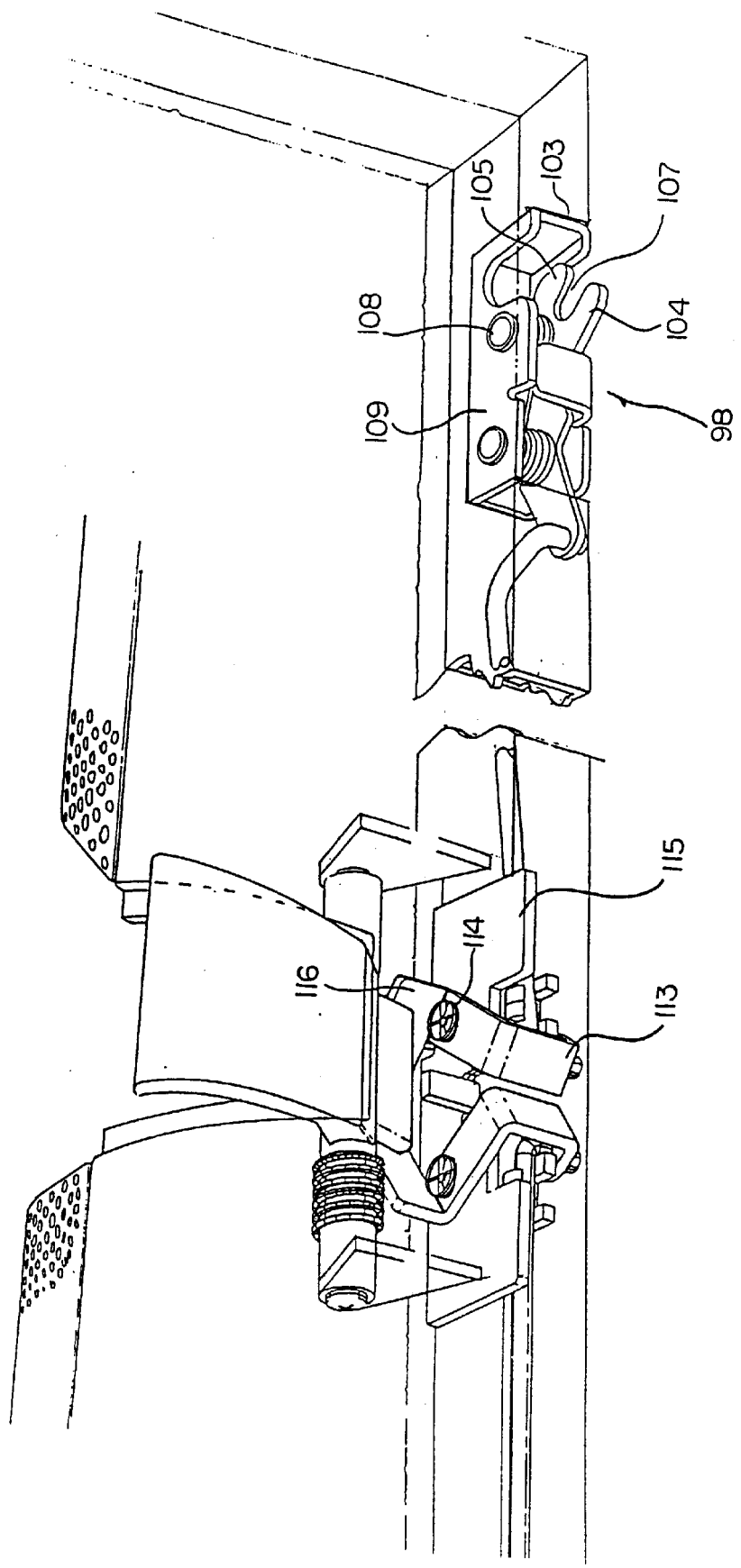
FIG. 10 is an isometric view similar to that of FIG. 9 showing the latch lever in an open unlatched position.

Turning now to FIGS. 8, 9 and 10 there is shown the latching arrangement by which the pane structure 56 is held in the closed position during normal operation. The latching arrangement includes a pair of latches both located in the bottom frame member adjacent the sides. Each latch 97 includes a pin 99 standing upwardly from the bottom pan member and a latch assembly 98 is mounted within the hollow interior 58 of the bottom frame member of the pane structure 56. The latch assembly 98 is operable from inside the vehicle for releasing the bottom part of the pane structure for pivotal movement to the open position for emergency exit.

The pin 99 includes a bottom threaded section which engages a washer 100, passes through the web member of the pan, engages a washer 101 and enters a hole 102 in the rail of the frame across the bottom of the window opening. An upper part of the pin passes through a slot 103 in the frame member 56 as the pane structure 56 is moved to the closed position. The latch assembly 98 inside the bottom frame member includes a pair of fingers 104 and 105 defining a recess 107 which the receives the pin 99.

The jaw including the fingers 104 and 105 is pivotally mounted on a pin 108 carried in a channel-shaped insert 109 inserted into the hole 103. Thus a top wall of the channel-shaped member 109 inserts underneath a top wall of the frame member and a bottom wall of a channel member sits on top of the bottom wall of the frame member.

In the open position shown in FIG. 10, the pin can slide into the open mouth of the recess 107 between the fingers 104 and 105. In the closed position shown in FIG. 9, the jaw pivots about the pin 108 so that an inside surface of the jaw 104 abuts against the pin and pulls the frame toward the interior of the window pane thus providing a cam action on the pin.

The jaw is pivotal around the pin 108 and is driven in the pivotal movement by a bell crank 110 pivotal about a pin 111 also mounted in the C-shaped member 109. The bell crank 110 and the jaw are spring biased by springs wrapped around the respective pivot pins.

The bell crank 110 is actuated by a rod 112 extending inside the frame longitudinally of the frame and movable along its length.

The rod 112 is actuated in its longitudinal movement by a bell crank 113 mounted for pivotal movement on a pin 114 carried on a mounting plate 115. The mounting plate is mounted within the frame member so that it is fixed relatively thereto and thus acts to hold the end of the rod so the rod is supported in position longitudinally of the frame member.

The bell crank 113 has a portion on top of the plate 115 and a further portion which extends down below the plate 115 where it carries the end of the rod 112. The portion of the bell crank 113 above the plate 115 carries an upstanding actuating plate 116 which projects to one side of the pivot pin 114 so that rearward pushing movement against the plate 116 acts to pull the rod away from the bell crank 110 thus causing the bell crank to pivot about its pin 111 and causing the jaw to move to the open position.

The latching assembly 98 forms one of a pair of symmetrical latching assemblies each arranged adjacent a side edge of the bottom frame member of the window frame structure. An actuating handle 118 is mounted on a pivot shaft 119 carried on a pair of brackets 120 and 121. The brackets 120 and 121 are carried on the inside surface of the interior cladding 175 so as to locate the pivot shaft 119 above the frame member of the bottom of the pane structure. The handle 118 follows the curvature of the curved portion 177 of the cladding and has side edges abutting ends 123, 124 of the cladding at an opening in the cladding. The handle thus provides a smooth attractive appearance contiguous with the cladding. A break 125 in the grill 179 provides an opening into which the fingers of the user can be inserted to pull on a top edge 126 of the handle, pulling the handle downwardly so that a bottom lug 127 of the handle underneath the pivot shaft 119 pushes against the plate 116 to move the bell cranks 113 from the closed position shown in FIG. 9 to the opened position shown in FIG. 10.

Thus the single handle at the center of the window pane structure actuates both of the latches simultaneously releasing the latches for the pane structures to be pivoted outwardly as previously described. The handle 118 is spring biased by a spring 128 on the pivot shaft 119 to hold the handle in the closed position.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A public transit vehicle comprising:
   a vehicle body having:
      a roof,
      two side walls each extending longitudinally of the vehicle,
      a vehicle floor connected to the side walls and spanning therebetween;
      each side wall including a plurality of window openings at spaced positions longitudinally of the side wall each containing a respective window;
      each window including a rectangular window pan fastened to the side wall and carried thereby so surround the window opening defining a window plane parallel to the side wall;
      the window pan being defined by four side pan members each along a respective side of the window opening, each pan member being shaped in cross section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;
      each window including a rectangular window pane structure having a window pane in the window plane and a surrounding pane frame member attached to the pane and defined by four frame members each along a respective side of the pane and connected at corners of the frame;
      the window pane structure being mounted in a closed position thereof in the window pan with each frame member including at least one sealing element butting against a respective one of the side pan members of the window pan;
      wherein there is provided a support member for the pane structure along a top one of the pan members, the support member defining a hinge allowing pivotal movement of the pane structure about a horizontal axis from the closed position to an open position, the hinge being arranged above the web portion of the top one of the pan members such that the frame members of the pane structure are inserted into the window pan in the closed position and pivot out of the pan in the open position.

2. The vehicle according to claim 1 wherein the at least one sealing element of each of the frame members in the closed position abuts a respective one of the pan members so that the pan members and the frame members co-operate in providing structural strength for the side wall of the vehicle body.

3. The vehicle according to claim 1 wherein the hinge of each pane structure is arranged to allow removal of the pane structure as an integral unit from the respective window pan independently of adjacent pane structures of adjacent window pans.

4. The vehicle according to claim 1 wherein the support member forms part of a drip rail member attached to the side wall of the vehicle body at the top pan member and defining a generally horizontal drip channel extending along the side wall of the vehicle body.

5. The vehicle according to claim 1 wherein each frame member of the pane structure includes a first portion adjacent the exterior flange portion of the respective pan member and a second portion projecting across the web portion of the respective pan member to a position adjacent the interior flange portion of the respective pan member, and wherein the window pane is mounted on an exterior surface of each frame member and extends to a position on the frame member at the first portion of the frame member so as to overlie at least a part of the exterior flange portion of the respective pan member and wherein there is provided a resilient sealing member attached to each frame member and having a first lip overlying an edge of the window pane and a second lip bridging a space between the first portion of the frame member and the exterior flange portion of the respective pan member.

6. A public transit vehicle comprising:
   a vehicle body having:
      a roof,
      two side walls each extending longitudinally of the vehicle,
      a vehicle floor connected to the side walls and spanning therebetween;
      each side wall including a plurality of window openings at spaced positions longitudinally of the side wall;
      each window including a rectangular window pan fastened to the side wall and carried thereby so surround the window opening defining a window plane parallel to the side wall;
      the window pan being defined by four side pan members each along a respective side of the window opening, each pan member being shaped in cross-section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;

each window including a rectangular window pane structure having a window pane in the window plane and a surrounding pane frame attached to the pane and defined by four frame members each along a respective side of the pane and connected at corners of the frame;

the window pane structure being mounted in the window pan with each frame member including at least one sealing element butting against a respective one of the side pan members of the window pan;

wherein at least one of the frame members of the pane structure includes a latch lever pivotally mounted inside a hollow interior thereof, the latch lever being engageable with a pin carried on the side wall of the vehicle body and projecting through the web of the pan at a position adjacent the latch lever for projecting into the hollow interior of said one of the frame members, the latch lever including a jaw for receiving and engaging the pin, the jaw being arranged to provide a positive locking cam action on the pin.

7. The vehicle according to claim 6 wherein the latch lever is provided in a bottom one of the frame members.

8. The vehicle according to claim 6 wherein the latch lever is operated by an actuating rod extending along the frame member and wherein there is provided an actuating handle mounted on the side wall of the vehicle body and pivotal relative thereto for driving movement of the actuating rod.

9. A public transit vehicle comprising:

a vehicle body having:
  a roof,
  two side walls each extending longitudinally of the vehicle,
  a vehicle floor connected to the side walls and spanning therebetween;
  each side wall including a plurality of window openings at spaced positions longitudinally of the side wall each containing a respective window;
  each window including a rectangular window pan fastened to the side wall and carried thereby so surround the window opening defining a window plane parallel to the side wall;
  the window pan being defined by four side pan members each along a respective side of the window opening, each pan member being shaped in cross section to define a web portion generally at right angles to the window plane, an exterior flange portion connected to the web portion at an exterior edge thereof and extending generally at right angles to the web portion outwardly from the window opening and an interior flange portion connected to the web portion at an interior edge thereof and extending generally at right angles to the web portion inwardly into the window opening;
  each window including a rectangular window pane structure having a window pane in the window plane and a surrounding pane frame member attached to the pane and defined by four frame members each along a respective side of the pane and connected at corners of the frame;
  the window pane structure being mounted in a closed position thereof in the window pan with each frame member including at least one sealing element butting against a respective one of the side pan members of the window pan;
  wherein there is provided a support member at the side wall of the vehicle body for the pane structure and abutting a top one of the pan members, the support member defining a hinge allowing pivotal movement of the pane structure about a horizontal axis from the closed position to an open position, the hinge being arranged above the web portion of the top one of the pan members such that the frame members of the pane structure are inserted into the window pan in the closed position and pivot out of the pan in the open position;
  wherein the hinge of each pane structure is arranged to allow removal of the pane structure as an integral unit from the respective window pan independently of adjacent pane structures of adjacent window pans.

10. The vehicle according to claim 9 wherein the window pan is molded as an integral structure.

11. The vehicle according to claim 9 wherein the hinge comprises a part cylindrical receptacle on the support member within which is received a part cylindrical insert of the pane structure allowing pivotal movement of the pane structure about a horizontal axis defined by the receptacle and wherein the part cylindrical receptacle and the part cylindrical insert are arranged such that the part cylindrical insert can be removed out of the receptacle in a direction relative thereto which is transverse to the axis after pivotal movement of the pane structure beyond a predetermined position thereof.

12. The vehicle according to claim 9 wherein the support member includes a generally horizontal drip channel extending along the side wall of the vehicle body.

13. The vehicle according to claim 9 wherein each frame member of the pane structure includes a first portion adjacent the exterior flange portion of the respective pan member and a second portion projecting across the web portion of the respective pan member to a position adjacent the interior flange portion of the respective pan member, and wherein the window pane is mounted on an exterior surface of each frame member and extends to a position on the frame member at the first portion of the frame member so as to overlie at least a part of the exterior flange portion of the respective pan member.

14. The vehicle according to claim 13 wherein there is provided a resilient sealing member attached to each frame member and having a first lip overlying an edge of the window pane and a second lip bridging a space between the first portion of the frame member and the exterior flange portion of the respective pan member.

15. The vehicle according to claim 14 wherein there is provided a resilient seal between an interior surface of the first portion of each frame member and an exterior surface of the exterior flange portion of the respective pan member.

* * * * *